US 6,588,406 B2

(12) United States Patent
Oprea

(10) Patent No.: US 6,588,406 B2
(45) Date of Patent: Jul. 8, 2003

(54) DUAL FUEL METERING AND SUPPLY SYSTEM FOR INTERNAL COMBUSTION ENGINES

(76) Inventor: Radu Oprea, 22711 20th Dr. SE., Unit H204, Bothell, WA (US) 98021

( * ) Notice: Subject to any disclaimer, the term of this patent is extended or adjusted under 35 U.S.C. 154(b) by 74 days.

(21) Appl. No.: 09/862,398

(22) Filed: May 21, 2001

(65) Prior Publication Data
US 2002/0195088 A1 Dec. 26, 2002

Related U.S. Application Data
(60) Provisional application No. 60/210,084, filed on Jun. 7, 2000.
(51) Int. Cl.[7] ............................................... F02M 21/02
(52) U.S. Cl. ................ 123/525; 239/585.1; 239/408; 239/412; 239/413; 123/304; 123/472
(58) Field of Search ................ 123/525, 304, 123/472; 239/407, 408, 412, 413, 585.1, 585.2, 585.3, 585.4, 585.5

(56) References Cited
U.S. PATENT DOCUMENTS 2,996,892 A * 8/1961 Clark .......................... 62/51
5,046,472 A * 9/1991 Linder ...................... 123/533
6,431,471 B2 * 8/2002 Anzinger et al. ........ 239/585.1

* cited by examiner

Primary Examiner—Tony M. Argenbright
Assistant Examiner—Katrina B. Harris

(57) ABSTRACT

A dual-fuel system, comprising an electrically triggerable injector, for alternatively or simultaneously supplying two distinct fuels to an internal combustion engine. The injector is connected to two separate fuel circuits. Each circuit comprises a fuel storage tank and a fuel rail. External valves control fuel access from the fuel storage tanks to the fuel rails. By appropriately activating the valves, one or both of the two fuels are fed to the injector. Inside the injector are two separate fuel paths, fluidically isolated from each other. Each internal fuel path communicates with one of the external fuel circuits. The injector contains a flow control valve for each separate fuel path and one electromagnet. In the non-activated position, both valves are resiliently urged against a common seat. When the electromagnet is energized, it simultaneously drives the two valves to open off the seat, thereby permitting one or two fuels to pass therethrough.

9 Claims, 7 Drawing Sheets

DUAL FUEL METERING AND SUPPLY SYSTEM FOR INTERNAL COMBUSTION ENGINES

This application claims benefit under 37 CFR 119e to the provisional application No. 60/210,084 filed Jun. 7, 2000.

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

This invention relates to fuel systems for internal combustion engines and more particularly to a fuel injection system whereby two distinct fuels are used, either alternatively or simultaneously.

With ever more stringent emissions regulations, the use of alternative gaseous fuels for operating internal combustion engines has become increasingly attractive. The more commonly used gaseous fuels are compressed natural gas (CNG) and liquefied petroleum gas (LPG). These gases can burn cleaner than gasoline and the cost per unit of energy is lower.

A majority of the end users are specifically requesting dual fuel systems, capable to run on gasoline or a gaseous fuel, such as CNG or LPG. While factory installed gaseous or dual fuel systems are available today, in many cases, the gaseous fuel system is still a retrofit complementing the original gasoline fuel system.

Another possible application for a dual fuel system is the use of methanol fuel as an alternative to, or in combination with, gasoline. In some countries, methanol is readily available and cost-effective. The use of a mixture of gasoline and methanol has certain advantages but it is difficult to implement, because the two liquids do not mix well.

The last decade has witnessed the migration of the automotive engine fuel system from carburetors to port fuel injection, using one fuel-metering device, in the form of a fuel injector, for each engine cylinder. This migration has been driven by the numerous drawbacks associated with central mixture preparation. Carburetors create a significant restriction in the intake air path, thereby impairing the volumetric efficiency of the engine. Furthermore, central mixture preparation entails air-fuel ratio maldistribution among the different cylinders of the engine, with negative consequences on the exhaust emissions.

Although virtually all of the modern automotive gasoline fuel systems are of the port fuel injection type, many of the dual fuel, liquid and gas, systems still resort to a centrally located air—fuel mixing device for supply and metering of the gaseous fuel. This central mixture preparation device most often consists of some variety of a carburetor. A few systems use central fuel injection instead.

A lot of effort has been made in the last few years to develop advanced port injection gaseous fuel systems. Gaseous variants of the gasoline port fuel injection have been developed for dedicated, gas only, applications.

Design of simple and reliable dual fuel port injection systems has been less successful. Most prior art dual fuel systems which do utilize injectors for both fuels use two separate injectors, one for each of the fuels (such as described by U.S. Pat. No. 5,755,211—Koch, or U.S. Pat. No. 5,713,336—King et al). Some of the disadvantages of this solution are:

Two separate fuel rails are used, cluttering the system and complicating installation.

Doubles the number of injectors in the system, compared to a single fuel application.

A second electronic control unit (ECU) is required to drive the gaseous fuel sub-system.

Attempts have been made to integrate the delivery of both fuels into one single injector device (U.S. Pat. No. 5,887,799—Smith). Some of the disadvantages of the solution proposed by the author of U.S. Pat. No. 5,887,799 are:

The impossibility to deliver both fuels at the same time.

The fuel rails are positioned at both ends of the injector, making installation difficult.

The need for a special injector driver that can reverse pulse polarity.

Other single—injector designs utilized for dual fuel, liquid—liquid injection, rely solely on injector pulse signal modulation to accommodate for the different fuels. This technique is not applicable to most dual fuel, liquid—gas systems, where the energy density of the gaseous fuel is typically much lower than the liquid's.

BRIEF SUMMARY OF THE INVENTION

The device of the invention overcomes the aforementioned disadvantages of the prior art by utilizing a single fuel injector to supply two distinct fuels to an internal combustion engine. The injector is fluidically connected to two separate external fuel circuits, one for each of the two distinct fuels.

Each external fuel circuit comprises a fuel storage tank, a fuel pressure regulator and a fuel rail. In the preferred embodiment, the two fuel rails are coaxial, which makes packaging identical to a gasoline fuel injection system. Fuel access from the storage tanks to the fuel rails is controlled by an arrangement of valves. The two external fuel circuits are fluidically isolated from each other.

The injector has two separate internal fuel circuits, with at least one fuel flow control valve in each circuit. Each internal fuel circuit is fluidically connected to one of the fuel rails and isolated from the other fuel circuit.

In the preferred embodiment, the two fuel control valves are simultaneously driven by an electromagnet and feed of a desired fuel is achieved by selectively connecting one or the other of the fuel rails to the desired fuel storage tank.

OBJECTS AND ADVANTAGES

Accordingly, Several Objects and Advantages of My Invention are

Ease of installation on the engine, since the fuel rails and injectors are similar in shape and size to the same components of a gasoline fuel injection system.

In the most common application, the conversion of a fuel injected gasoline engine to bi-fuel operation, on gasoline and a gaseous fuel, the fuel system of the invention does not entail any modifications of, or restrictions in, the engine intake air duct, thereby preserving the original gasoline engine performance and maximizing the performance potential for the gaseous fuel.

The fuel system, according to the invention, eliminates the need for a separate controller for the second fuel sub-system.

The possibility to run two distinct fuels simultaneously with one injector.

The possibility to use more than just two different fuels: i.e. compressed natural gas (CNG) and liquefied propane gas (LPG) could alternatively use the same rail—but two distinct tanks—and the system would be a triple fuel one.

The fuel system, according to the invention, can be used for bi-phase, liquid or gas, LPG fuelling.

LIST OF REFERENCE NUMERALS

| | |
|---|---|
| 11 | Main Fuel Storage Tank |
| 12 | Main Fuel Pump |
| 13 | Main Rail Inlet Valve |
| 14 | Main Fuel Rail |
| 15 | Main Fuel Pressure Regulator |
| 16 | Secondary Fuel Storage Tank |
| 17 | Secondary Fuel Pressure Regulator |
| 18 | Secondary Rail Inlet Valve |
| 19 | Secondary Fuel Rail |
| 20 | Dual Fuel Injector |
| 21 | Engine Intake Air Duct |
| 22 | Main Fuel Inlet |
| 23 | Secondary Fuel Inlet |
| 24 | Main Fuel Passage |
| 25 | Secondary Fuel Passage |
| 26 | Injector Body |
| 27 | Electromagnet |
| 28 | Electromagnet Core |
| 29 | Electromagnet Coil |
| 30 | Common Valve Seat |
| 31 | Nozzle |
| 32 | Internal O-Ring |
| 33 | Main Fuel Discharge Passage |
| 34 | Secondary Fuel Discharge Passage |
| 35 | Main Fuel Atomizing Orifice |
| 36 | Main Metering Orifice |
| 37 | Secondary Metering Orifices |
| 38 | Main Fuel Valve |
| 38A | Axial Transfer Duct |
| 38B | Radial Transfer Duct |
| 39 | Main Stroke Limiter |
| 40 | Secondary Fuel Valve |
| 40A | Secondary Fuel Transfer Port |
| 41 | Secondary Stroke Limiter |
| 42 | Secondary Return Spring |
| 43 | Main Return Spring |
| 44 | Electrical Connector |
| 45 | Electrical Terminals |
| 46 | External O-Ring |
| 47 | Separating O-Ring |

DETAILED DESCRIPTION OF THE INVENTION

In the preferred embodiment, the fuel system uses a liquid main fuel and a gaseous secondary fuel.

Figure 1:
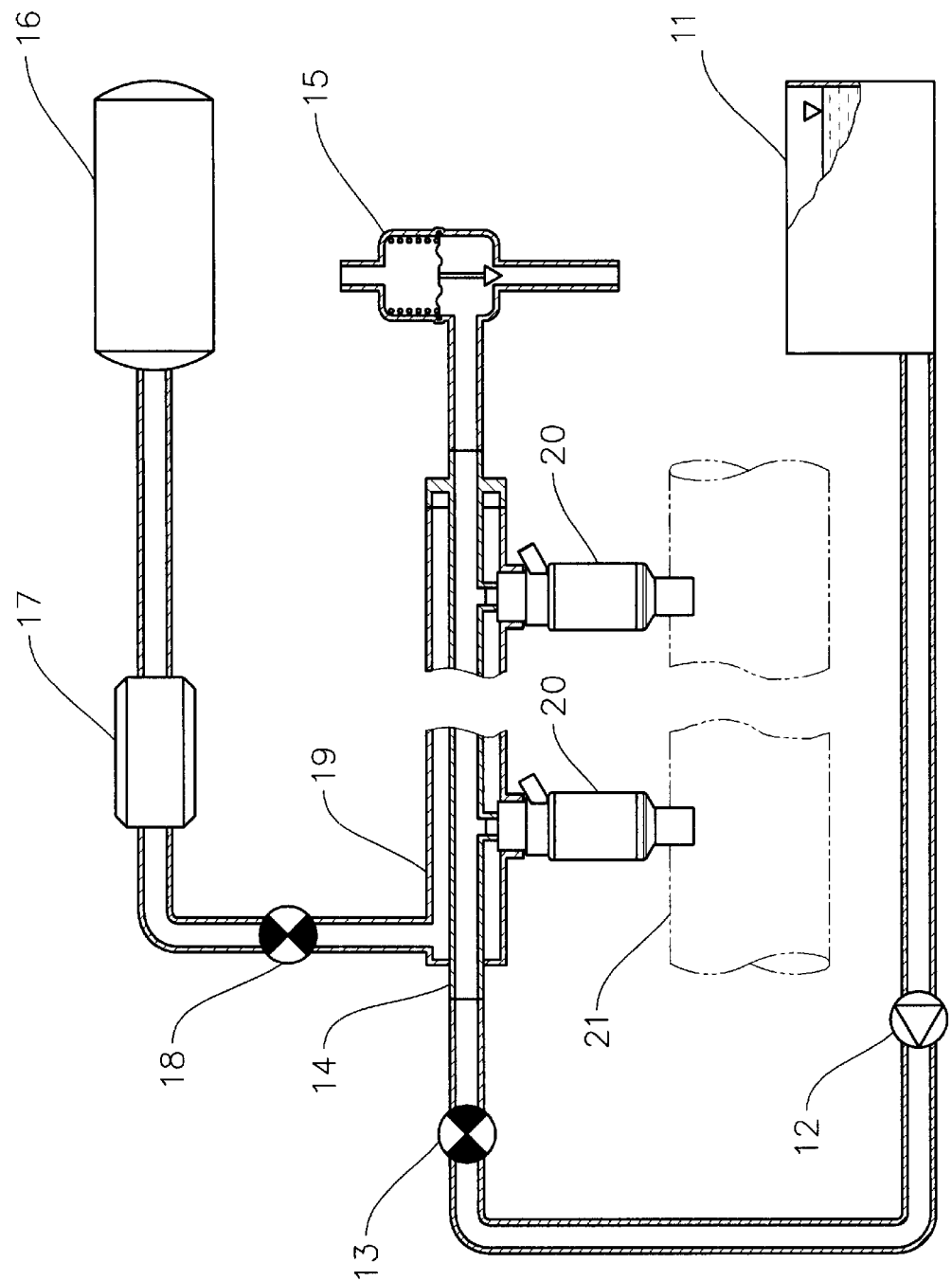
FIG. 1 is a schematic representation of the fuel system of the invention.

FIG. 1 shows a schematic illustration of a preferred embodiment of the dual fuel system, according to the invention. The system depicted by FIG. 1 comprises a main fuel section and a secondary fuel section. The main fuel section comprises a main fuel storage tank 11, a main fuel pump 12, a main rail inlet valve 13, a main fuel rail 14 and a main fuel pressure regulator 15. The secondary fuel section comprises a secondary fuel storage tank 16, a secondary pressure regulator 17, a secondary rail inlet valve 18 and a secondary fuel rail 19. A plurality of dual fuel injectors 20 are attached and fluidically connected to both fuel rails. The injectors extend into an engine air intake duct 21.

Figure 2:
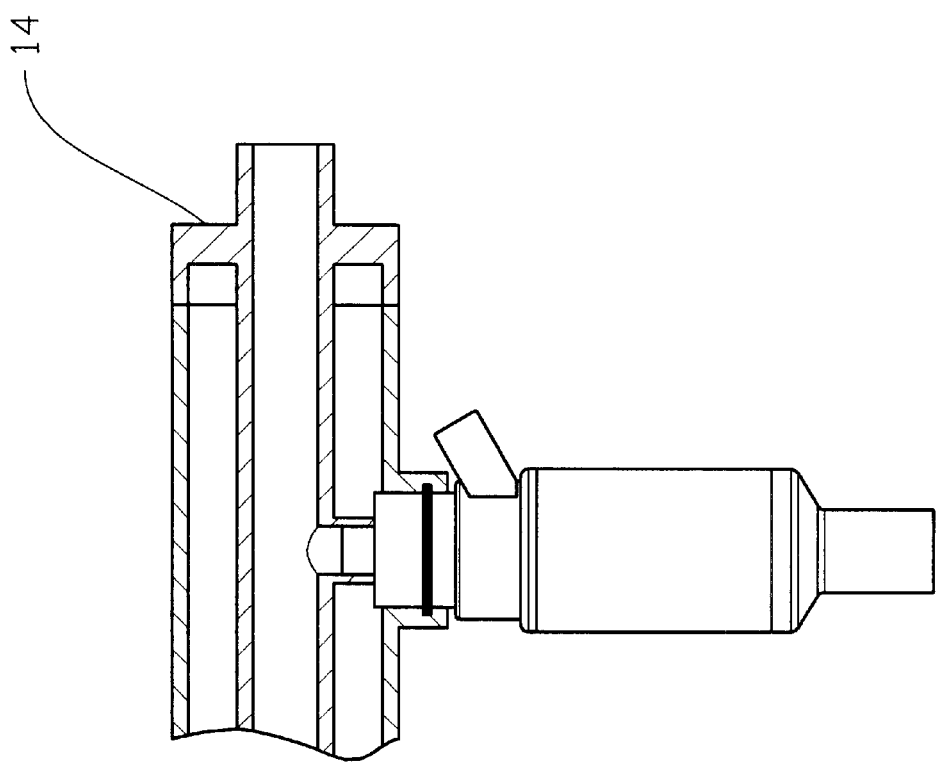
FIG. 2 is a detailed cross-sectional view through the fuel rails and injectors.
Figure 2:
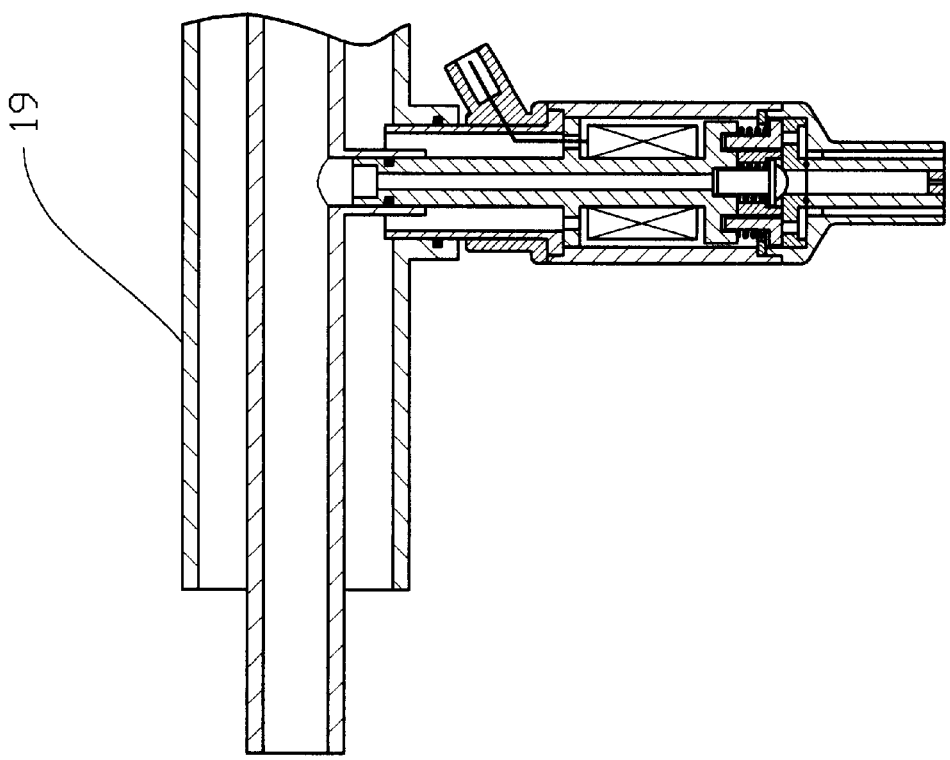

In a preferred embodiment, main fuel rail 14 is coaxially mounted inside secondary fuel rail 19, as illustrated in FIG. 1 and FIG. 2.

Figure 3:
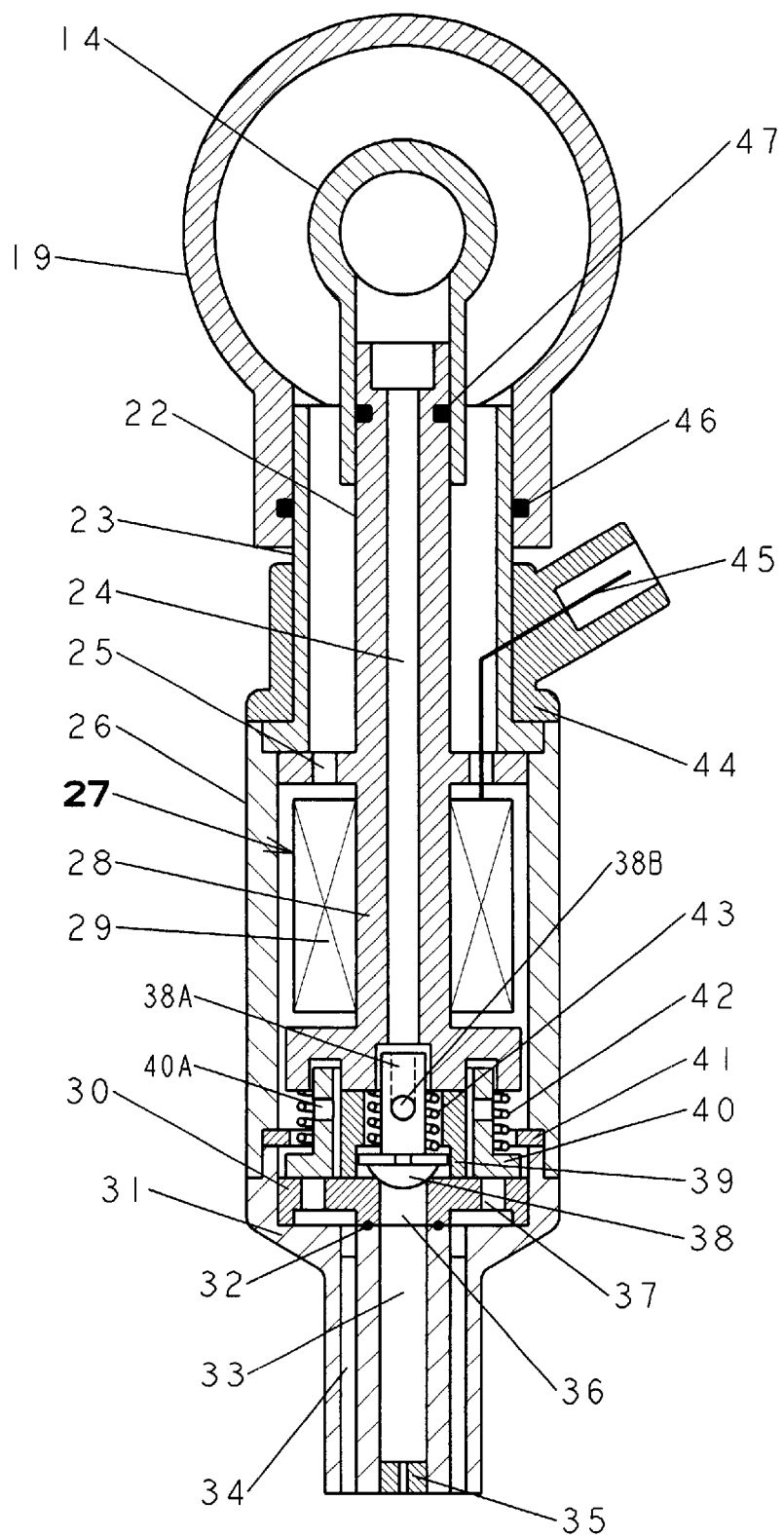
FIG. 3 illustrates a preferred embodiment of the installed injector, according to the invention, in its neutral, non-activated position.

Referring now to the cross-sectional view in FIG. 3, a preferred embodiment of the installed injector is illustrated. As shown in this figure, the injector is in its neutral mode, neither the main nor the secondary fuel feeds being activated.

The injector has a main fuel inlet 22, which fluidically connects the injector to main fuel rail 14. Surrounding main fuel inlet 22 is a secondary fuel inlet 23, which fluidically connects the injector to secondary fuel rail 19. At least one main fuel passage 24 is machined through main fuel inlet 22. At least one secondary fuel passage 25 is machined through secondary fuel inlet 23.

Both main and secondary fuel inlets are fixedly mounted into an injector body 26. Also fixedly mounted in the injector body are an electromagnet 27 comprising an electromagnet core 28 and an electromagnet coil 29, a common valve seat 30, and a nozzle 31. An internal o-ring 32 provides a fluid tight seal between common valve seat 30 and nozzle 31. In the preferred embodiment, main fuel inlet 22 also serves as a magnetic core to electromagnet 27.

There is at least one main fuel discharge passage 33 machined through nozzle 31.

Surrounding main fuel discharge passage 33 is an annular secondary fuel discharge passage 34. In the absence of an annular passage there may be a plurality of circular holes, arranged in a circular pattern and serving the same purpose.

The nozzle end opposite to the common seat is permanently open to communicate with the internal combustion engine intake air duct, for both the main and the secondary fuel discharge passages. In the preferred embodiment, a main fuel atomizing orifice 35 is placed at the open end of main fuel discharge passage 33.

Common valve seat 30 has at least one centrally located main metering orifice 36 and at least one secondary metering orifice 37. In the preferred embodiment, there is a plurality of secondary metering orifices 37, arranged in a circular pattern surrounding the centrally located main metering orifice.

A main fuel valve 38 is slidably mounted in the injector body, between common valve seat 30 and electromagnet core 28. The main fuel valve has an axial transfer duct 38A, which communicates with a plurality of radial transfer ducts 38B.

Surrounding the main fuel valve is a main stroke limiter 39. The stroke limiter is fixedly mounted between electromagnet core 28 and common valve seat 30. Means are provided to ensure a fluid tight seal between main stroke limiter 39 and adjoining electromagnet core 28 and common valve seat 30.

Surrounding main stroke limiter 39 and slidably mounted between electromagnet core 28 and common valve seat 30, is a secondary fuel valve 40. The secondary fuel valve is cup-shaped and has at least one secondary fuel transfer port 40A. In the preferred embodiment, there is a plurality of radially arranged secondary fuel transfer ports 40A. The cup shape of the secondary fuel valve, in combination with the fuel transfer ports equalize fuel pressure between the space inside and the space outside the valve, whereby reducing the force required to open the valve.

A secondary stroke limiter 41 is fixedly mounted inside injector body 26 and has the role to limit the secondary fuel valve travel.

Secondary fuel valve 40 and main fuel valve 38 are resiliently urged to their closed position, against common valve seat 30, by a secondary return spring 42 and a main return spring 43, respectively. Thus, a fluid tight seal is provided between the fuel valves and the common seat.

An electrical connector 44 is fixedly attached to injector body 26. The connector positively locates the fixedly mounted components into the injector body and seals the injector from the surroundings. Inside the connector are a plurality of electrical terminals 45, electrically connected to electromagnet coil 29.

An external o-ring 46 provides a fluid tight seal between secondary fuel inlet 23 and the surroundings, while a separating o-ring 47 fluidically isolates the main fuel rail from the secondary fuel rail.

Operation

Figure 4:
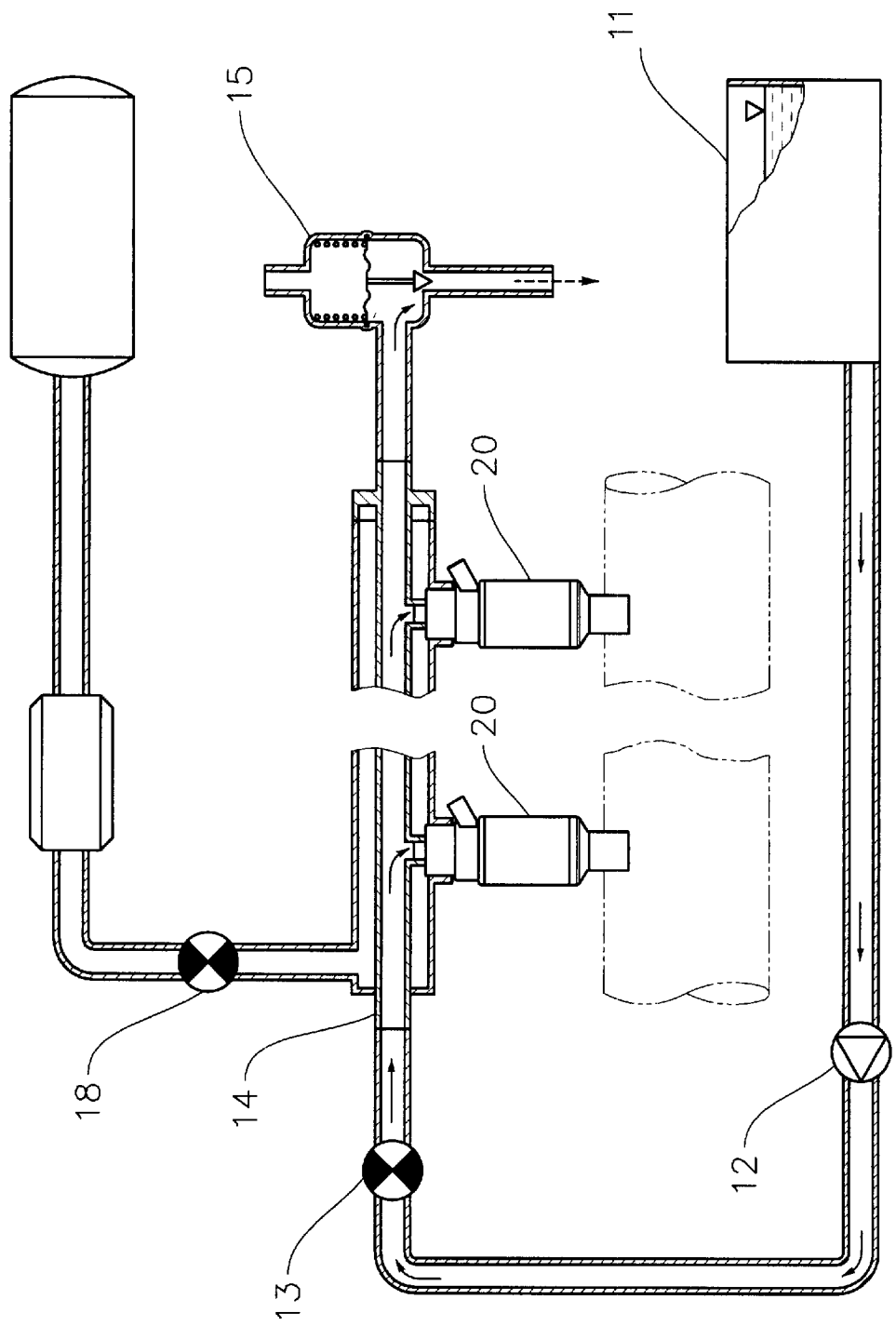
FIG. 4 is a schematic illustration showing the fuel system, according to the invention, operating in its mode for feeding a main fuel.
Figure 4A:
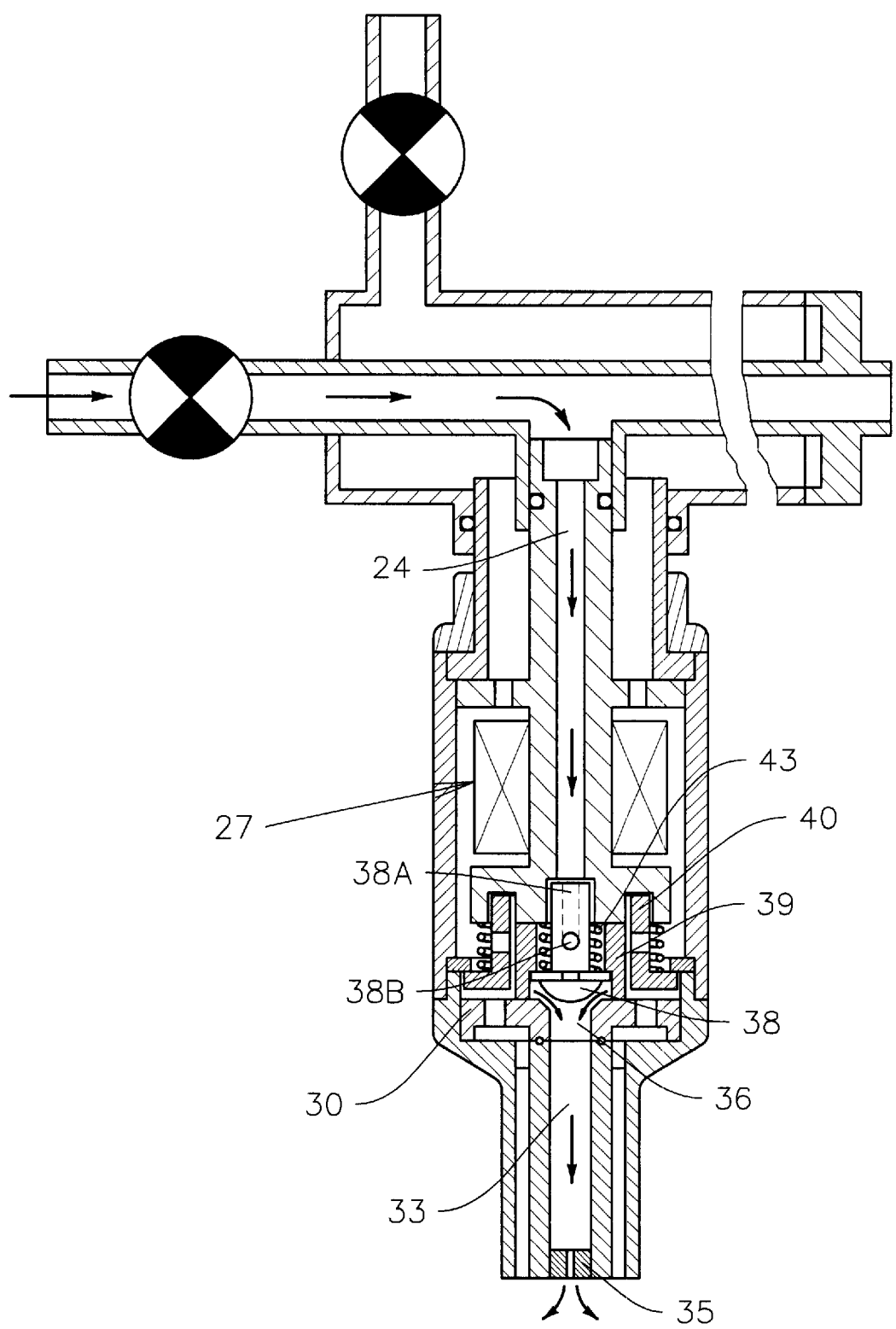
FIG. 4A shows a preferred embodiment of the injector, according to the invention, operating on a main fuel.

Referring to FIG. 4 and 4A, the use of the device of the invention for feeding a main fuel is illustrated. As shown in FIG. 4, main rail inlet valve 13 is open and main fuel pump 12 is energized, thereby allowing a main fuel to flow from main fuel storage tank 11 into main fuel rail 14.

Main fuel pressure regulator 15 keeps the main fuel at a substantially constant pressure in the main fuel rail. Secondary rail inlet valve 18 is closed. Since only the main fuel rail contains a fuel under pressure, only a main fuel is allowed to pass from main fuel rail 14 into injectors 20.

Referring now to FIG. 4A, the pressurized main fuel flows through injector internal main fuel passage 24, axial transfer duct 38A, and radial transfer ducts 38B. The fuel flow stops at the main fuel valve, which, in its non-activated position is resiliently urged against common seat 30 by main return spring 43, thereby providing a fluid tight seal at the common seat.

When electrical pulses are fed to electromagnet 27, main fuel valve 38 and secondary fuel valve 40 are caused to simultaneously lift off common valve seat 30 and against the spring action of main and secondary return springs, respectively.

Main fuel valve 38 thereby opens and stays open for the duration of the electrical pulse, permitting the main fuel to flow through main metering orifice 36, main fuel discharge passage 33, and finally out through main fuel atomizing orifice 35. Main stroke limiter 39 provides for a substantially constant main valve travel, therefore the fuel quantity delivered in one pulse depends only on the pulse duration.

Figure 5:
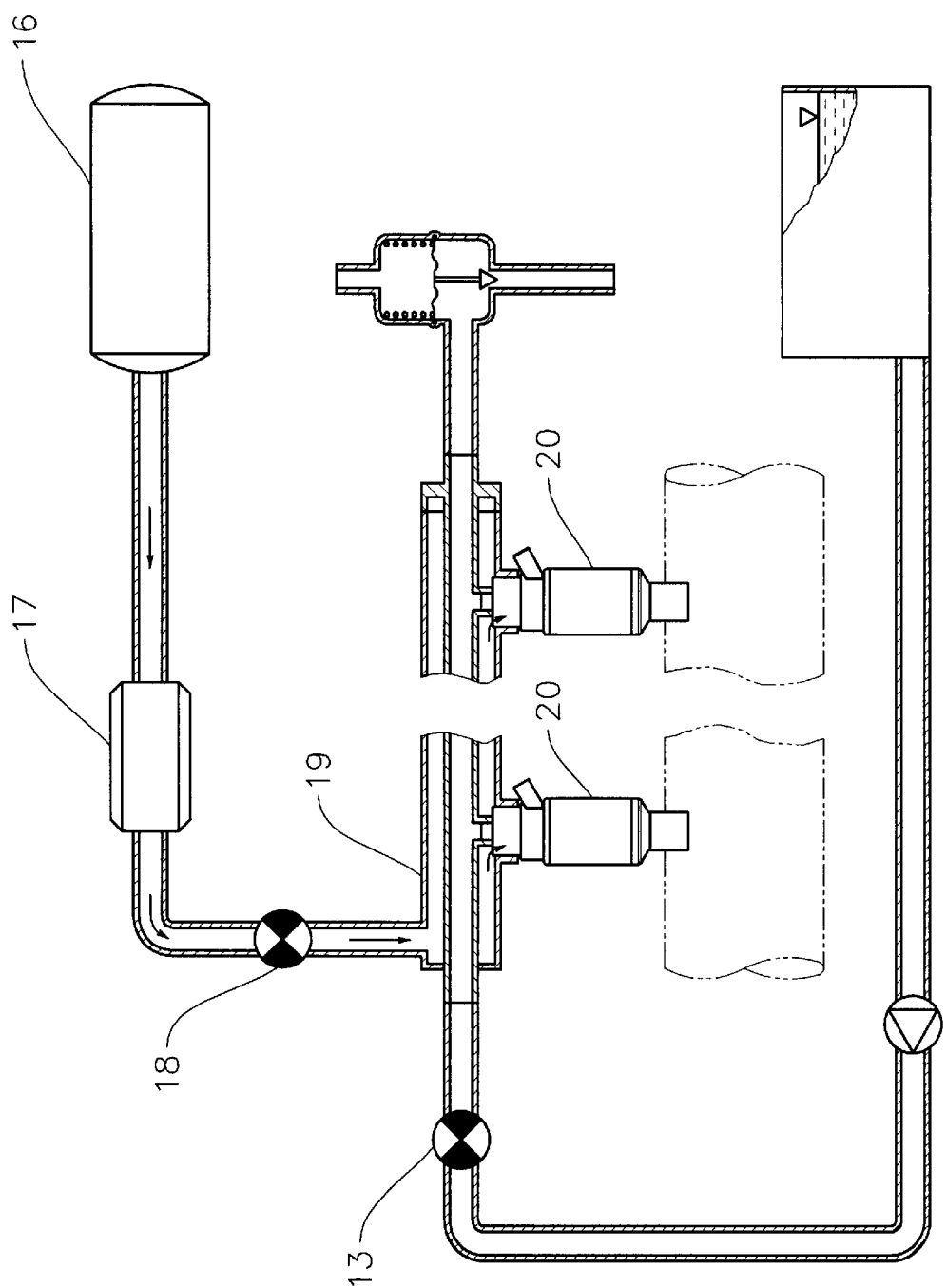
FIG. 5 is a schematic illustration showing the fuel system, according to the invention, operating in its mode for feeding a secondary fuel.
Figure 5A:
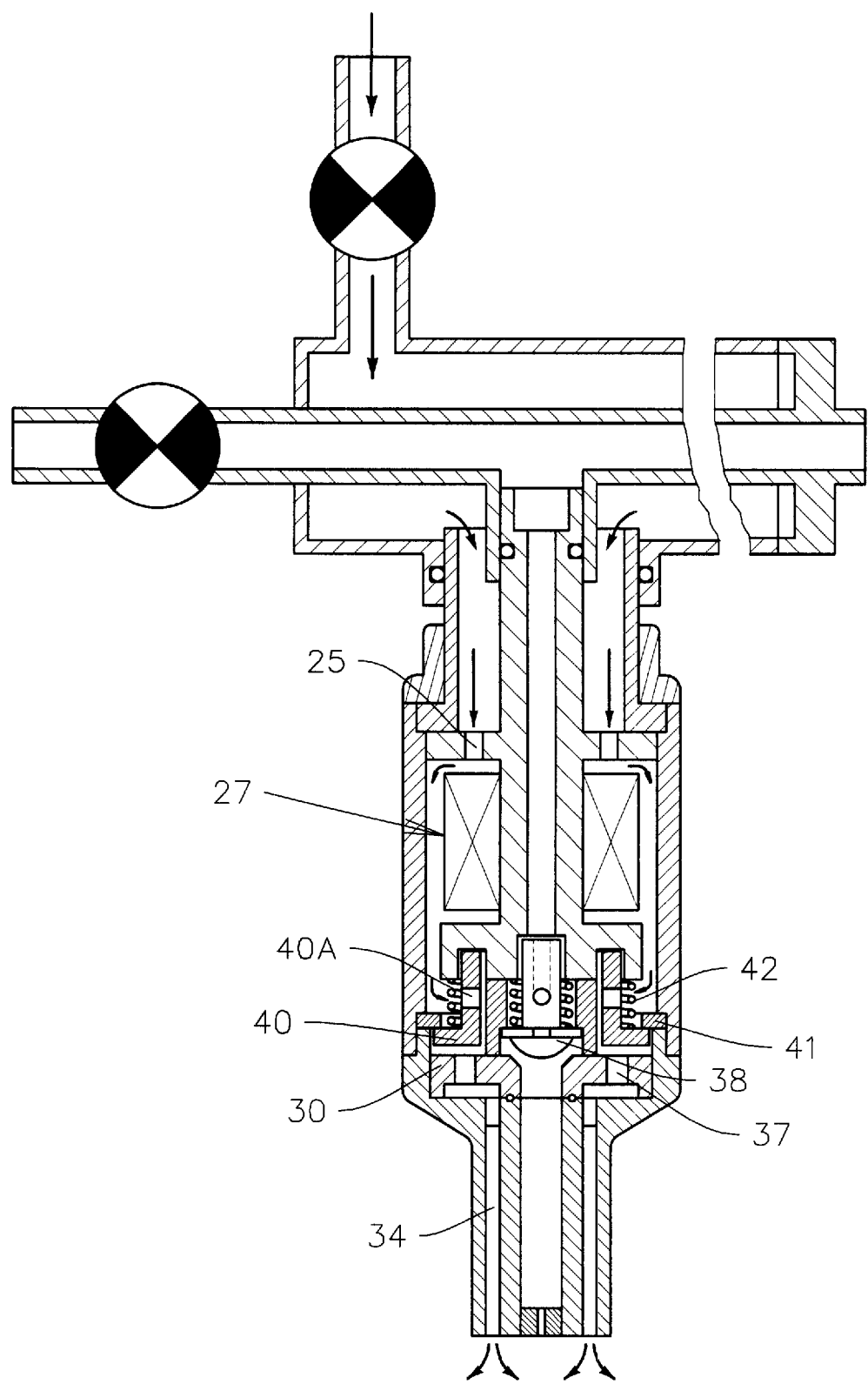
FIG. 5A shows a preferred embodiment of the injector, according to the invention, operating on a secondary fuel.

Referring to FIG. 5 and 5A, the use of the device of the invention for feeding a secondary fuel is illustrated. As shown in FIG. 5, when secondary fuel delivery is required, secondary rail inlet valve 18 is open, thereby allowing a secondary fuel to flow from secondary fuel storage tank 16 through secondary fuel pressure regulator 17 and into secondary fuel rail 19. The secondary fuel pressure regulator maintains a substantially constant fuel pressure in the secondary fuel rail. Main rail inlet valve 13 is closed. Since only the secondary fuel rail contains a fuel under pressure, a secondary fuel only is allowed to pass from the secondary fuel rail into injectors 20.

Referring now to FIG. 5A, the pressurized secondary fuel flows through the injector internal secondary fuel passages 25, around electromagnet 27 and through secondary fuel transfer port 40A. The fuel flow stops at the secondary fuel valve, which, in its non-activated position is resiliently urged against common seat 30 by secondary return spring 42, thereby providing a fluid tight seal at the common seat.

Electrical pulses are fed to electromagnet 27, causing main fuel valve 38 and secondary fuel valve 40 to simultaneously lift off common valve seat 30, against the spring action of the main and secondary springs, respectively. Secondary fuel valve 40 thereby opens and stays open for the duration of the electrical pulse, permitting the secondary fuel to flow through secondary metering orifice 37 and finally out through secondary fuel discharge passage 34. Secondary stroke limiter 41 provides for a substantially constant secondary valve travel, therefore the fuel quantity delivered in one pulse depends only on the pulse duration.

As both main and secondary fuel valves open simultaneously, even when the system supplies just one of the two fuels, all of the fuel that may be trapped in the currently unused circuit is rapidly purged into the engine, thereby avoiding fuel deposits in the unused circuit. Additionally, continuous functioning of both valves prevents the currently unused valve from binding to its seat.

Conclusion, Ramifications and Scope

Thus the reader will see that the fuel system of the invention provides a simple yet effective solution for feeding an internal combustion engine with two distinct fuels, either alternatively or simultaneously. When converting a fuel injected spark ignition engine to bi-fuel functioning, the fuel system of the invention permits easy mounting on the engine, with little or no changes to the intake manifold. All the original electrical and electronic hardware is retained, the only changes required by the bi-fuel functioning occurring in software. Since no restrictions are added to the intake air path, in a gasoline-gaseous fuel bi-fuel application, the system maintains engine performance on gasoline while maximizing performance on the gaseous fuel.

While my description contains many specificities, these should not be considered as limitations on the scope of the invention, but rather as an exemplification of one preferred embodiment thereof. Many other variations are possible. For example:

- An alternative embodiment uses two electromagnets, one for each metering valve.
- Another alternative embodiment achieves fuel metering by means of calibrated orifices located downstream of the fuel control valves, preferably in the nozzle.
- While the preferred embodiment illustrates a typical port fuel injection system, a different embodiment of the same device may be designed to operate as a central, or throttle body, fuel injection system.

Accordingly, the scope of the invention should be determined not by the embodiment illustrated, but by the appended claims and their legal equivalents.

LIST OF REFERENCE NUMERALS

1 Fuel Inlet
2 Fuel Passage
3 Fuel Port
4 Body
5 Solenoid
6 Nozzle
7 Electrical insulator
8 First Electrode
9 Valve Seat
10 Fuel Discharge Cavity
11 Combustion Shell
12 Combustion Chamber
13 Second Electrode
14 Torch nozzle
15 Pilot Injection Port
16 Main Injection Port
17 Valve
17A Valve Stem
17B Locating Collar
18 Fuel Passage Groove
19 Stroke Limiter
20 First Spring Retainer
21 Return Spring
22 Second Spring Retainer
23 Armature
24 Electrical connector
25 Electrical terminals

I claim:

1. A dual fuel injector for alternatively or simultaneously feeding and metering two distinct fuels to an internal combustion engine, comprising:
    (a) at least one main fuel passage,
    (b) at least one secondary fuel passage, fluidically isolated from said main fuel passage,
    (c) a common valve seat,
    (d) an electromagnet,
    (e) a main fuel valve, slidably mounted between said electromagnet and said common valve seat, and said main fuel valve fluidically communicating with said main fuel passage,
    (f) a secondary fuel valve, slidably mounted between said electromagnet and said common valve seat, and said secondary fuel valve fluidically communicating with said secondary fuel passage,
    (g) means, including a main stroke limiter, for limiting the travel of said main fuel valve to a predetermined value,
    (h) divider means, including said stroke limiter, for isolating a volume surrounding said main fuel valve from the remainder of the space delimited by said common valve seat and said electromagnet,
    (i) means, including a spring, for resiliently urging said main fuel valve to a closed position against said common valve seat, providing a fluid tight seal thereat,
    (j) means, including a spring, for resiliently urging said secondary fuel valve to a closed position against said common valve seat, providing a fluid tight seal thereat, and
    (k) said electromagnet, in its energized state, simultaneously driving said main fuel valve and said secondary fuel valve in a same direction, away from said common valve seat, to an open position, thereby creating a main opening between said common valve seat and said main fuel valve and a secondary opening between said common valve seat and said secondary fuel valve, and
    (l) said divider means fluidically isolating said main opening from said secondary opening,
    (m) whereby a main fuel and a secondary fuel can flow through said main opening and said secondary opening, respectively.

2. A dual fuel system for alternatively or simultaneously feeding two distinct fuels to an internal combustion engine, comprising the dual fuel injector of claim 1 and further comprising:
    (a) a main fuel storage tank,
    (b) a secondary fuel storage tank,
    (c) a main fuel rail,
    (d) a secondary fuel rail,
    (e) said main fuel passage of said dual fuel injector being fluidically connected to said main fuel rail,
    (f) said secondary fuel passage of said dual fuel injector being fluidically connected to said secondary fuel rail,
    (g) said dual fuel injector being mounted to the intake air duct of said internal combustion engine, in such a manner as to allow said main opening and said secondary opening to communicate with said intake air duct of said internal combustion engine,
    (h) means, including an electronic control unit, for applying an electrical signal of a predetermined duration to said electromagnet, and
    (i) means, including valves, for either selectively or simultaneously connecting said main fuel rail to said main fuel storage tank and said secondary fuel rail to said secondary fuel storage tank.

3. The fuel injector of claim 1 wherein said main fuel valve and said secondary fuel valve are coaxial.

4. The fuel injector of claim 1, further comprising a main metering orifice, of a substantially lesser area than said main opening, and said main metering orifice being advantageously located inside said main fuel passage, thereby said main metering orifice effectively controlling the flow rate of said main fuel through the injector.

5. The fuel injector of claim 1, further comprising a secondary metering orifice, of a substantially lesser area than said secondary opening, and said secondary metering orifice being advantageously located inside said secondary fuel passage, thereby said secondary metering orifice effectively controlling the flow rate of said secondary fuel through the injector.

6. The fuel injector of claim 1 wherein said common valve seat consists of at least two distinct parts assembled such as to serve the same purpose.

7. A fuel injector for internal combustion engines, comprising:
    (a) a valve seat with an annular fluid flow passage cut therethrough,
    (b) a slidably mounted valve having a cylindrical wall of substantially greater thickness than the width of said annular fluid flow passage,
    (c) said cylindrical wall having an inside diameter substantially smaller than the inside diameter of said annular fluid flow passage,
    (d) said cylindrical wall of said valve being substantially coaxial with said annular fluid flow passage,
    (e) said cylindrical wall having at least one open end which, in the closed position of said valve, abuts against said valve seat, thereby providing a fluid tight seal at said annular fluid flow passage, (f) transfer means, including openings cut through said cylindrical wall for allowing a fluid to freely circulate between an interior space to said cylindrical wall and an exterior space to said cylindrical wall, thereby equalizing the pressure of said fluid between said interior space and said exterior space, and (g) means for driving said valve to an open position, away from said valve seat, thereby uncovering said annular fluid flow passage, (h) whereby a fluid can freely flow from said interior space to said annular fluid flow passage and from said external space to said annular fluid flow passage.

8. The fuel injector of claim 7 wherein said valve is cup-shaped, having a closed end opposite said at least one open end.

9. The fuel injector of claim 7 wherein said valve is tube-shaped, having an open end opposite said at least one open end.

* * * * *